(No Model.)

G. W. BEYER & G. W. HARPER.
MOLD.

No. 461,777.                    Patented Oct. 20, 1891.

WITNESSES:

INVENTORS:
George W. Beyer
George W. Harper
Edwin H. Brown
BY THEIR ATTY'

UNITED STATES PATENT OFFICE.

GEORGE W. BEYER AND GEORGE W. HARPER, OF BROOKLYN, ASSIGNORS TO HIRAM W. HARRIS, OF NEW YORK, N. Y.

MOLD.

SPECIFICATION forming part of Letters Patent No. 461,777, dated October 20, 1891.

Application filed April 29, 1891. Serial No. 391,010. (No model.)

*To all whom it may concern:*

Be it known that we, GEORGE W. BEYER and GEORGE W. HARPER, both of Brooklyn, Kings county, and State of New York, have invented a certain new and useful Improvement in Molds, of which the following is a specification.

Our invention relates particularly to molds for shaping plastic material.

Figure 1:
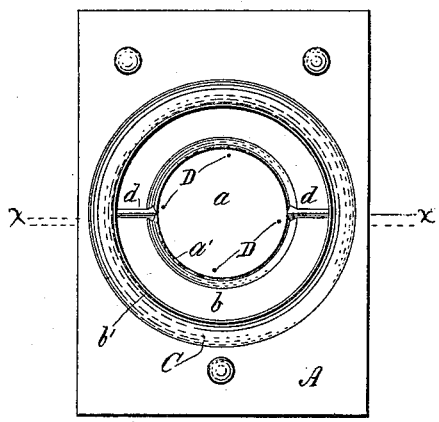
Figure 2:
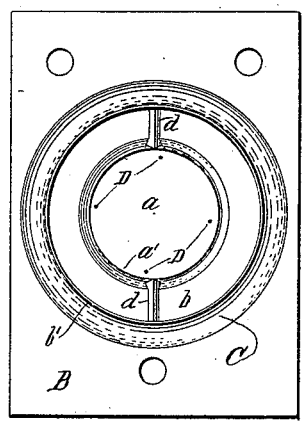
Figure 3:
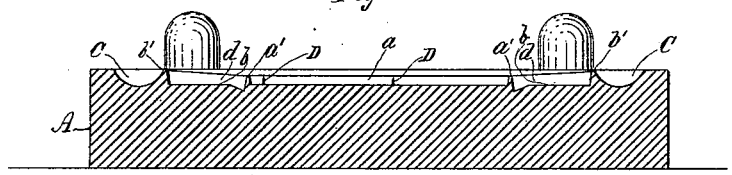
Figure 4:
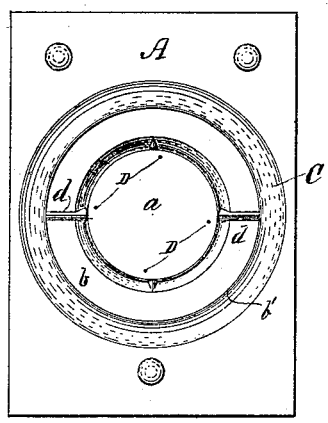

In the accompanying drawings, Figures 1 and 2 are face views of the two opposite sections or plates of the mold. Fig. 3 is an enlarged sectional view of one of said sections or plates, taken on the line $xx$ of Fig. 1. Fig. 4 is a face view of one section, illustrating a modification.

Referring to the drawings, in which similar letters of reference designate corresponding parts, A B indicate, respectively, the opposite plates of the mold. Each of these plates is provided with a shallow circular cavity $a\ a$, the edges of which are defined by annular raised portions $a'\ a'$.

$b\ b$ designate shallow annular cavities surrounding the raised portions $a'\ a'$ and central circular cavities $a\ a$, and $b'\ b'$ designate circular cutting or defining edges extending around and bounding the outer circumference of the cavities $b\ b$.

C C designate circular waste-cavities bounding the cutting or defining edges $b'\ b'$.

D D D D designate outwardly-projecting pins arranged within the central cavities $a\ a$.

$d\ d\ d\ d$ designate ridges extending from the annular raised portions $a'\ a'$ to the cutting or defining edges $b'\ b'$.

The material shaped by this mold may be of one color or a combination of colors. The mold above described we have used for the manufacture of game-counters. We have found it desirable to form in the faces of these counters designs, such as stars, flags, &c. This is done by impressing on one or both sides of the plastic material forming the body of the counter a thin sheet of similar plastic material of the same or different color bearing the desired design. This thin sheet of plastic material is laid within the central circular cavity $a$ of one plate of the mold if it is desired to form the design in but one side of the counter. The material is preferably of a circular form and of such dimensions as that it will fit snugly in the cavity $a$. The sheet is then pressed against the bottom of said cavity in such manner that the pins D will project into or through the same and thereby hold it in place. This is a desideratum, for we have found that when the material forming the body of the counter comes into close juxtaposition with the sheet bearing the design it will often cause the latter to warp and permit of its being pressed to one side. When this happens, the design not being in the center of the counter, the appearance of the latter is spoiled.

In the preparation of the plastic material of which we form articles by our improved mold it is almost impossible to prevent the admixture with it of air. Under pressure, this air will often come to the surface, and unless means are supplied to allow its escape will form pits or similar depressions in the surface of the article being molded. This difficulty is obviated in our improvement. In the embodiment of the invention shown in the drawings the annular raised portions $a'\ a'$ of the mold form in each face of the counter a circular groove, and the ridges $d\ d$ form grooves leading from the circular groove to the waste-cavity C. When the counter has thus been shaped, and while in a plastic state, it is put into a finishing-mold of the same construction as that above described, saving that it is without the annular raised portions $a'\ a'$, ridges $d\ d$, and pins D. Pressure is then applied, and under it all air which has remained in the counter will escape into the waste-cavities through the grooves formed by the raised portions $a'\ a'$ and ridges $d\ d$ and the faces of the counter are pressed smooth and polished.

We have described a mold having a continuous annular raised portion to form a groove in the counter for the passage of air when the counter is being pressed in the finishing-mold. It is obvious, however, that this raised portion may be of any desired configuration—as, for instance, in segments or projections, as illustrated in Fig. 4.

Although we have shown but a single mold, it is obvious that the molds may be made in series, the two opposite plates containing as many mold-cavities as desired.

It will be understood that, although we have described a mold for shaping game-counters, we do not limit ourselves thereto, as the invention may be used with equally advantageous results in the manufacture of analogous articles.

What we claim as our invention, and desire to secure by Letters Patent, is—

1. In a mold, the combination of plates having shaping-cavities, waste-cavities, and pins or projections disposed in said shaping-cavities, substantially as described.

2. In a mold, the combination of plates having shaping-cavities, waste-cavities, annular raised portions, and ridges leading therefrom to the waste-cavities, substantially as described.

3. In a mold, the combination of plates having shaping-cavities and waste-cavities, annular raised portions, ridges leading therefrom to the waste-cavities, and means, substantially as described, for securing material bearing a design or designs within the mold, as and for the purpose set forth.

4. The process of forming game-counters and analogous articles, consisting of placing a mass of plastic material in one plate of a mold, attaching to the other plate a sheet bearing a design, said sheet being secured within the mold-cavity, placing the latter plate bearing the design over the former plate, and applying pressure, as and for the purpose specified.

In testimony whereof we have signed our names to this specification in the presence of two subscribing witnesses.

GEORGE W. BEYER.
GEORGE W. HARPER.

Witnesses:
JAMES DEVINE,
EDWARD B. GRAVES.